(12) United States Patent
Maity et al.

(10) Patent No.: US 7,643,959 B2
(45) Date of Patent: Jan. 5, 2010

(54) METHODS, SYSTEMS, AND COMPUTER READABLE MEDIA THAT PROVIDE PROGRAMMING FOR A SENSOR MONITORING SYSTEM USING A SOFTPROCESSOR

(75) Inventors: Sanjoy Maity, Snellville, GA (US); Govind Kothandapani, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 1190 days.

(21) Appl. No.: 10/755,077

(22) Filed: Jan. 9, 2004

(65) Prior Publication Data
US 2006/0136627 A1 Jun. 22, 2006

(51) Int. Cl.
*G06F 13/38* (2006.01)
(52) U.S. Cl. ........................................ 702/123
(58) Field of Classification Search .................. 702/123
See application file for complete search history.

(56) References Cited
U.S. PATENT DOCUMENTS
2001/0045159 A1* 11/2001 Johnson et al. ................ 95/26
2003/0033558 A1* 2/2003 Parvathala et al. ............ 714/30

OTHER PUBLICATIONS

A Compiler Project for Translating a C Subset to SPARC Assembly Language, Duncan E. Clarke, Nov. 1993, p. 1-21.*
Princeton University, COS 217: Introduction to Programming Systems, SPARC Assembly Language Summary, 2002 by Robert M. Dondero, Jr. , p. 1-4.*
From C To Assembly Language, By Hiran Ramankutty, Published in Issue 94 of Linux Gazette, Sep. 2003, section 1-12.*

* cited by examiner

Primary Examiner—Tung S Lau
(74) Attorney, Agent, or Firm—Hope Baldauff Hartman, LLC (57) ABSTRACT

Methods, systems, and computer readable media provide a softprocessor that is executed by a hardware processing device of a sensor monitoring system and provide an application that is executed by the softprocessor being executed by the hardware processing device. The softprocessor may be compiled for different hardware processing devices such that the customized programming remains independent of the particular hardware processing device present in the computer monitoring system. Tools for creating the custom programming for the softprocessor may be provided to entities purchasing the softprocessor so that the entities are not dependent upon the entity creating the softprocessor.

16 Claims, 6 Drawing Sheets

METHODS, SYSTEMS, AND COMPUTER READABLE MEDIA THAT PROVIDE PROGRAMMING FOR A SENSOR MONITORING SYSTEM USING A SOFTPROCESSOR

COPYRIGHT AUTHORIZATION

A portion of the disclosure of this patent document, including the computer program listings referenced below, contains material which is subject to copyright protection. The copyright owner has no objection to the facsimile reproduction by any one of the patent disclosure, as it appears in the Patent and Trademark patent files or records, but otherwise reserves all copyright rights whatsoever.

REFERENCE TO COMPUTER PROGRAM LISTINGS APPENDICES INCLUDED ON COMPACT DISC

Computer program listings appear in appendices included on compact disc. The appendices includes an Appendix A, an Appendix B, an Appendix C, and an Appendix D that includes the computer program listings. The contents of these Appendices including Appendices A, B, C, and D are hereby incorporated by reference.

TECHNICAL FIELD

The present invention is related to programming of hardware processing devices of sensor monitoring systems. More particularly, the present invention is related to providing programming to control a hardware processing device of a computer monitoring system by executing a softprocessor on the hardware processing device and providing programming written for the softprocessor to result in control of the monitoring system.

BACKGROUND

Electronic systems such as conventional computer systems and monitoring systems utilize hardware processing devices to execute programming to perform various tasks. For example, a monitoring system may include various sensors for temperature, voltage, speed, and other values. As a specific example, there may be 200-300 sensors in a monitoring system for a single server computer monitoring such values as power supply voltage, disk drive temperature, and cooling fan speed. The sensors of a monitoring system communicate back through a bus to a master node that is a hardware processing device. Such hardware processing devices may range in complexity, but system-on-a-chip ("SOC") processors are often used in monitoring systems due to the efficient packaging and full functionality.

Conventionally, the SOC operates within the monitoring system by executing an engine defining the monitoring activities. The engine references a flat file of sensor definitions that are specific for the particular monitoring system. The engine is based on custom programming compiled for the particular SOC that it is to be executed by. To modify the monitoring activities, such as when new sensors require monitoring activities not previously provided for, then the engine must be modified at the source level, then recompiled and loaded onto the SOC. This is a time-consuming and troublesome process. Because the engine is typically created by a first entity and packaged in compiled form with the SOC while the monitoring system is constructed and/or commercialized by a second entity, any change to the monitoring activities by the second entity necessitates that the second entity rely on the first entity to modify the engine accordingly to include the new monitoring activities.

An example of such monitoring activities includes control logic. For example, an initial engine may allow the monitoring system to monitor the sensors and then trigger an alarm to annunciate a problem. However, it may be desirable to add new monitoring activities such as control logic to enable the monitoring system to shut down a malfunctioning element such as a cooling fan and/or to control the operation of additional cooling fans to compensate. Should the manufacturer and/or seller of the monitoring system wish to include this new monitoring function, then the manufacturer must rely on the provider of the engine programming to adapt the source code to provide this control logic and then recompile the engine for the particular SOC being employed. This results in an impediment for the manufacturer or seller of the monitoring system, in terms of both time and costs of development. Furthermore, this requires that the manufacturer or seller disclose the details of the monitoring system to the engine provider when such disclosure may not be desired.

SUMMARY

Embodiments of the present invention address these issues and others by providing a softprocessor that is run by the hardware processing device. The softprocessor may then execute customized programming that is created for the softprocessor rather than requiring such customized programming to be incorporated into engine programming that is created for the hardware processing device. The customized programming may be written in a variety of languages for the softprocessor including low-level assembly language and may be packaged with the hardware processing device. Such customized programming for controlling the monitoring activities conducted by the hardware processing device including communicating with the sensors may then be written for the softprocessor using tools for the softprocessor. These tools may be made available to the entity wishing to define the monitoring activities itself, such as the manufacturer and/or seller of the monitoring system.

One embodiment is a method of providing programming for a hardware processing device of a monitoring system including a plurality of sensors. The method involves creating a first source code defining a softprocessor program that creates a softprocessor and compiling the first source code for the hardware processing device to create a softprocessor program binary operable on the hardware processing device. The method further involves creating a second source code defining an application program for the softprocessor that sets forth instructions for communicating with the plurality of sensors and compiling the second source code for the softprocessor to create an application program binary operable by the softprocessor. The softprocessor binary is executed upon the hardware processing device and the application program binary is executed upon the softprocessor binary being executed upon the hardware processing device to provide instruction to the hardware processing device for communicating with the plurality of sensors.

Another embodiment is a system for providing programming for a hardware processing device of a monitoring system including a plurality of sensors. The system includes a softprocessor binary compiled for and being executed by the hardware processing device to create a softprocessor. The system also includes an application program binary setting forth instructions for communicating with the plurality of sensors that is compiled for and is executed by the softprocessor. Execution of the application program binary by the softprocessor results in instructions being provided to the hardware processing device for communicating with the plurality of sensors.

Another embodiment is a computer readable medium including instructions that when executed by a hardware processing device of a monitoring system having a plurality of sensors performs various steps. A softprocessor binary is executed upon the hardware processing device to create a softprocessor. An application program binary is executed upon the softprocessor binary being executed upon the hardware processing device to provide instructions to the hardware processing device for communicating with the plurality of sensors.

DETAILED DESCRIPTION

Embodiments of the present invention provide programming for a hardware processing device of a sensor monitoring system. The embodiments include a softprocessor that executes upon the hardware processing device, and an application program that executes upon the softprocessor. The application program can be customized as necessary and is written and compiled for the softprocessor thereby making the application program independent of the hardware processing device ultimately performing the underlying processing operations of the application to result in communication with the sensors being monitored. Tools for creating and modifying the application program can then be made available to those entities wishing to create custom monitoring systems while the softprocessor may be packaged with or separately from the hardware processing device being utilized within the monitoring system.

Figure 1:
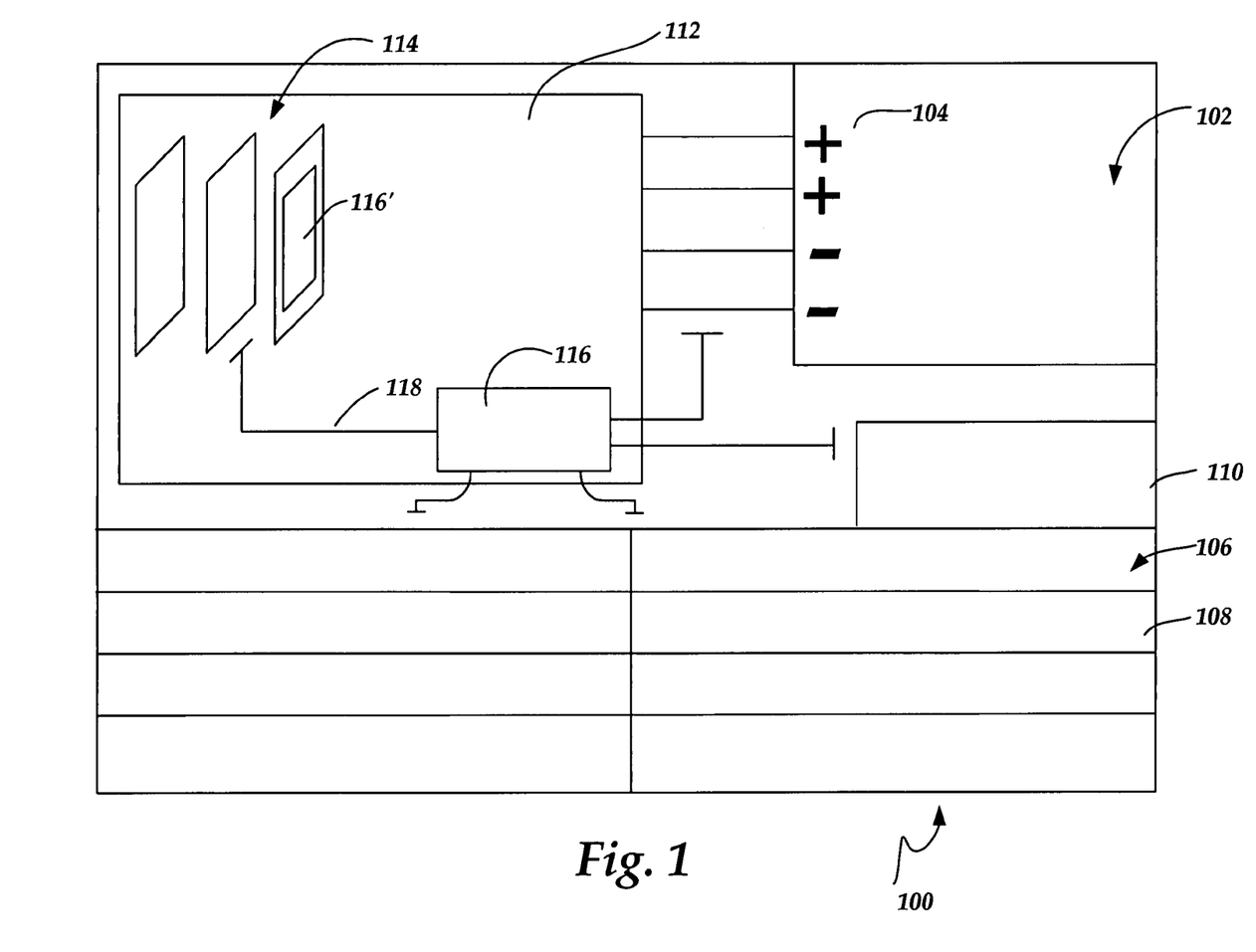
FIG. 1 shows a computer system with various components being monitored, which serves as one example of an operating environment for embodiments of the present invention.

FIG. 1 illustrates an example of an operating environment in which embodiments of the present invention may be employed. FIG. 1 shows a computer system 100 having various vital components that are being monitored to ensure the proper operation of the computer system 100. For example, the computer system 100 may be a file server on a network where the operation of the computer system 100 is critical to the functioning of a business, government, or other organization such that the computer system 100 is continuously monitored.

The computer system 100 includes many components that may be monitored. For example, the computer system 100 includes a power supply 102 that has several outputs 104 that provide various voltages to components of the computer system. The computer system 100 may include a drive cage 106 including a plurality of hard disk drives 108, such as a redundant array of independent disks ("RAID"). One or more fans 110 may be included to circulate air within the computer system 100, such as to cool the power supply 102 and the drives 108. The computer system 100 also includes a motherboard 112 that includes memory, a processor, a data bus and other elemental components of a computer system. Several expansion cards 114 may be plugged into a bus of the motherboard 112 to provide additional functionality such as video and other input/output functions.

A monitoring system 116 may also be included on the motherboard 112, or alternatively, a monitoring system 116' may be included on one of the expansion cards 114. The monitoring system 116 includes a data bus 118 that allows the monitoring system to provide communications between sensors of the monitoring system that act as slave nodes and a hardware processing device such as an SOC that acts as the master node.

The monitoring system 116 has sensors for many of the components of the computer system 110 and may also have control circuits that operate in conjunction with one or more of these components. For example, a speed sensor may monitor the speed of the fan 110 while a control circuit increases or decreases the duty cycle of the power being supplied to the fan as necessary so that the speed of the fan is as desired. As other examples, a temperature sensor may monitor the temperature of the hard disk drives 108, which in turn results in control of the power being supplied to the fan 110, and a voltage sensor may monitor one of the output voltages of the power supply 102.

Figure 2:
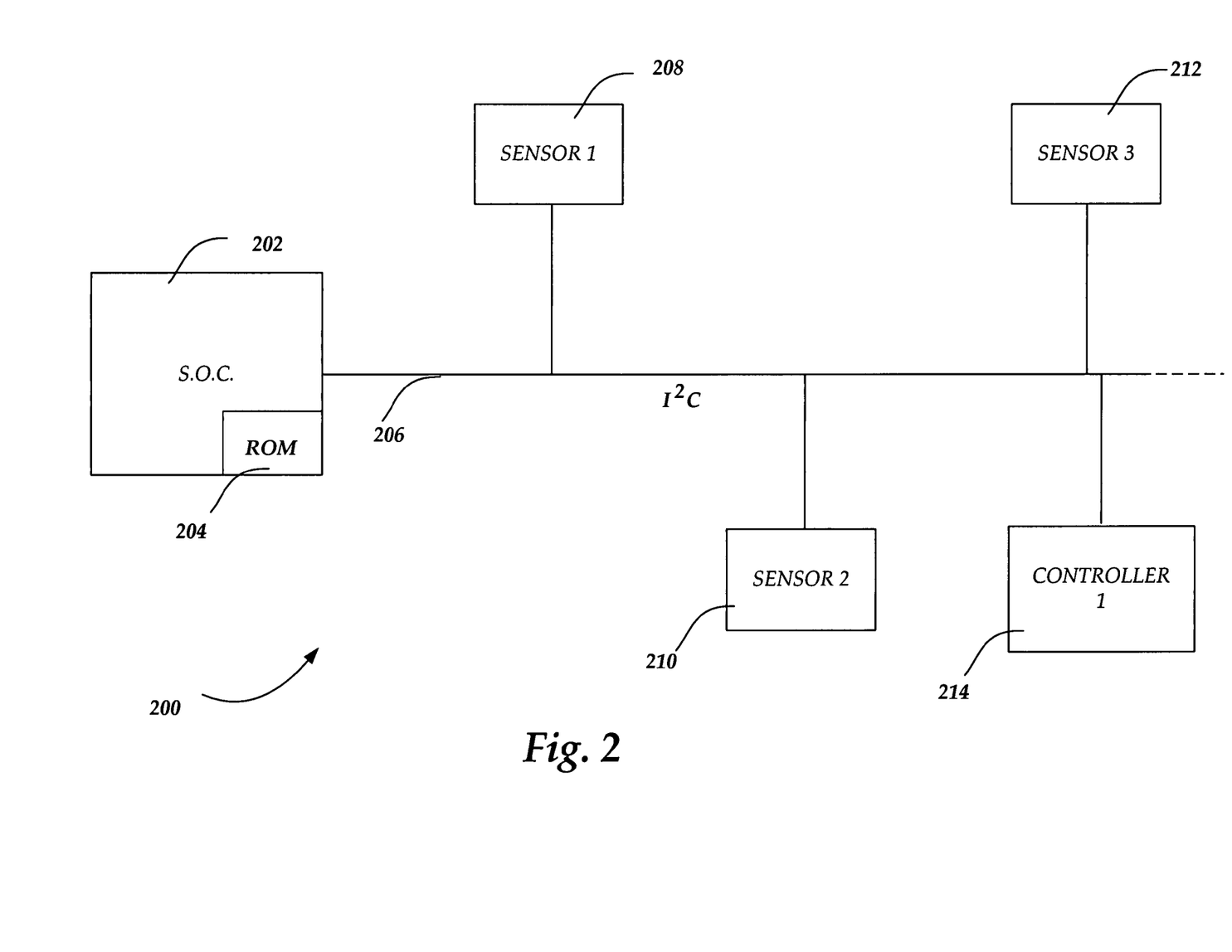
FIG. 2 shows an illustrative monitoring system involving a hardware processing device, such as an SOC, for employing embodiments of the present invention.

FIG. 2 shows an example of such a monitoring system in more detail. The monitoring system 200 typically includes a hardware processing device 202 such as an SOC. The SOC 202 may have internal memory such as read only memory 204 or may alternatively have external memory accessed over a data bus. The memory 204 stores the programming for the SOC 202 to allow for communication with sensors 208, 210, 212, annunciation of alarms, manipulation of control circuits 214, etc. over a data bus 206. An example of an SOC 202 is the PC87435 manufactured by National Semiconductor. An example of the data bus 206 is the I2C bus, which allows for the SOC 202 to act as a master node while the sensors 208, 210, 212 and control circuit(s) 214 act as slave nodes.

There are many varieties of sensors that may be used within a monitoring system. Examples of sensors 208, 210, 212 include but are not limited to speed sensors such as the LM85 manufactured by National Semiconductor, voltage sensors such as the LM81 manufactured by National Semiconductor, and temperature sensors such as the LM75 also manufactured by National Semiconductor. These sensors typically include a controller for establishing the communications with the SOC 202 over the bus 206.

There are many varieties of control circuits 214 that may be used within a monitoring system to control various aspects of the components being monitored. A fan speed control circuit is one example. A power control circuit for a disk drive is another example, which serves to control the application of power to drives 108 based upon temperature, drive status, or other factors. These control circuits 214 also typically include a controller for establishing the communications with the SOC 202 over the bus 206.

Figure 3:
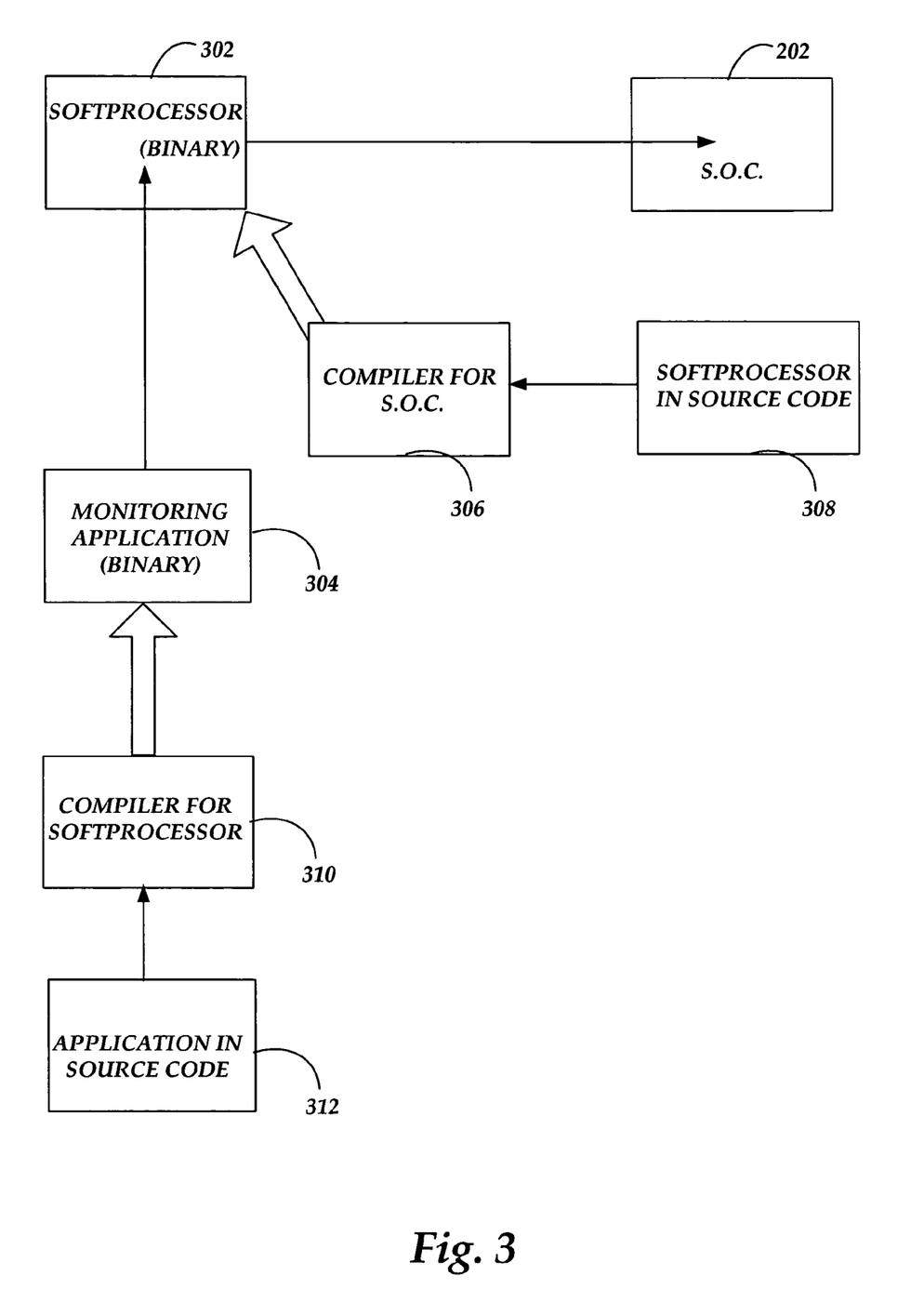
FIG. 3 is a diagram illustrating the relationship between the hardware processing device of the monitoring system, a softprocessor that executes upon the hardware processing device, and an application program that executes upon the softprocessor to direct communications of the hardware processing device with sensors on a communication bus.

FIG. 3 illustrates the application of an embodiment of the present invention to the monitoring system such as that shown in FIGS. 1 and 2. Rather than having an engine being executed by the SOC 202 that relies upon a flat file of sensor definitions that contains no logic, embodiments of the present invention provide for a softprocessor 302 that is executed by the SOC 202. An application program 304 is then executed by the softprocessor 302 to define which sensors to communicate with and at what bus address and any logic to be included in the monitoring of the sensors, such as logic for making decisions about which sensors to communicate with and logic for making decisions about how to provide control of components of the system being monitored.

To establish the softprocessor 302, softprocessor source code 308 is written in a language, either high-level or low-level, that may be compiled for the particular SOC 202 that is being employed. However, it is desirable to create the softprocessor source code in a high-level language that has compilers for various hardware processing devices so that the softprocessor source code 308 remains independent of the particular hardware chosen. The C language is an example of a high-level language that may be compiled for various hardware processing devices 202 of a monitoring system. The softprocessor source code 308 is compiled with a compiler 306 written for the particular hardware processing device 202 being used. A compiler 306 is commercially available for each hardware processing device that may be chosen. An example of copyright protected softprocessor source code written in the C language is provided in Appendix A incorporated herein by reference.

The result of compiling the softprocessor source code 308 is a softprocessor 302, which is a binary file that is executable by the particular hardware processing device 202 that it has been compiled for. The details of one example of a softprocessor, such as that defined by the copyright protected source code of Appendix A, is discussed below in relation to FIG. 6. Upon the softprocessor 302 being executed by the hardware processing device 202, the softprocessor 302 establishes its own processor characteristics for use by application programs such that it obscures the underlying hardware processing device 202 from the monitoring application 304.

The monitoring application 304 results from application source code 312 being written in a particular language. For example, the application source code 312 may be written in a high-level language such as C or may be written in a low-level language such as assembly. Because the softprocessor 302 appears as one processor type from the perspective of the application 304, regardless of the hardware processing device 202 that is used, the application source code need not be written in a language that has a compiler for a variety of processors. Instead, the language need only have a compiler 310 written for the softprocessor 302. Accordingly, even low-level languages such as an assembly language may be used to create the application source code 312. An example of copyright protected application source code may be found in both Appendix B (a copyright protected assembly language program for monitoring), incorporated herein by reference and in Appendix C (a copyright protected XML document providing individual functions written in assembly language that may be pieced together to form an assembly language program for monitoring), also incorporated herein by reference.

The result of compiling the application source code 312 is the application program 304 which is a binary file that is executable by the softprocessor 302. Accordingly, the application 304 makes no direct call to the hardware processing device 202, but instead indirectly controls the behavior of the device 202 by directly controlling the softprocessor 302. The manner in which the softprocessor 302 decodes the instructions of the application binary 304 is provided in the copyright protected document of Appendix D, incorporated herein by reference, which sets forth the description of registers and table of instructions of the softprocessor 302. As mentioned above, these details of the softprocessor 302 are discussed in more detail below with reference to FIG. 6.

Figure 4:
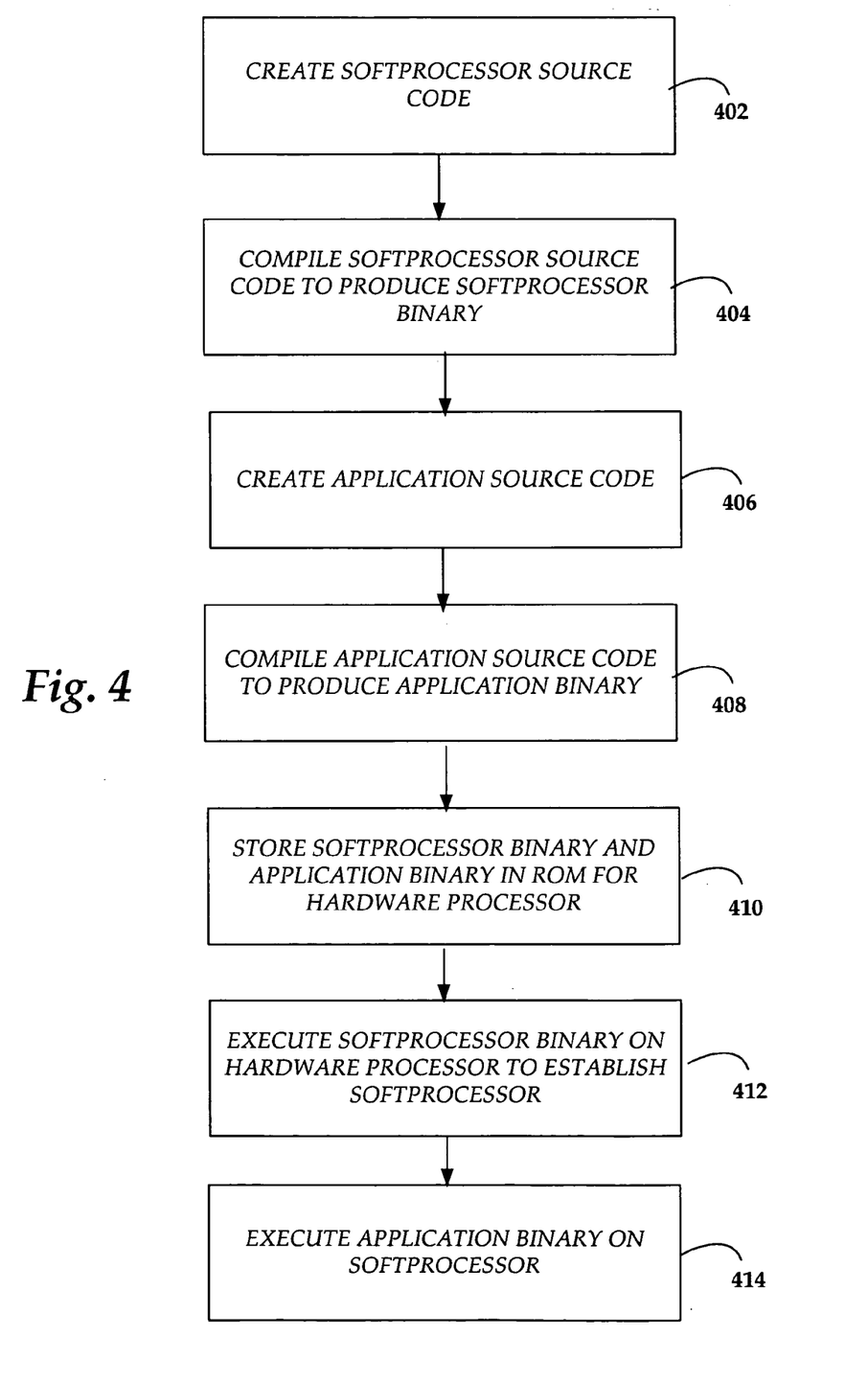
FIG. 4 is an operational flow for an embodiment showing the logical operations for providing programming to the hardware programming device of the monitoring system by establishing a softprocessor for the hardware programming device and establishing an application program for the softprocessor.

FIG. 4 shows the logical operations in creating the programming for the hardware processing device 202 through the softprocessor 302 and application program 304. The softprocessor source code 308 is created in a particular high-level language at code operation 304. The softprocessor source code 308 is then compiled by the compiler 310 for the particular hardware processing device to produce the softprocessor binary 302 at compile operation 404. The application source code 312 is created in either a high or low level language at code operation 406. The application source code 312 is then compiled by the compiler 310 for the softprocessor 302 to produce the application binary 304 at compile operation 408.

As one example of readying the monitoring system for market, a first entity may provide the hardware processing device 202 to be included in the monitoring system together with the softprocessor 302 in binary form to a second entity who will manufacture and/or sell the monitoring system. As discussed below, the softprocessor 302 may be stored in ROM of the hardware processing device 202 prior to delivery of the softprocessor 302 and hardware processing device 202 to the second entity. Alternatively, the softprocessor 302 may be provided on a separate medium such as a disk that is provided to the second entity. The second entity may then create the application program for the softprocessor according to the set of sensors and particular logic that the second entity desires to include in the monitoring system.

The softprocessor 302 and application program 304 are loaded onto the memory of the hardware processing device 202 at store operation 410. As noted above, the softprocessor 302 may be provided to a second entity already stored into the memory prior to the application programming being completed. Then, upon the second entity creating and compiling the application program, it is stored along with the softprocessor within the memory accessible by the hardware processing device 202.

Upon the softprocessor 302 being stored in memory of the hardware processing device 202 and upon the hardware processing device 202 being included within the monitoring system, the softprocessor 302 may then be executed by the hardware processing device 202 at execution operation 412. Once the softprocessor 302 has been instantiated through execution, the application program 304 may then be executed by the softprocessor 302 to begin the monitoring process at execution operation 414.

As noted above, the softprocessor source code and/or binary code and the application source code and/or binary code may be stored on a computer readable medium such as on a data disk, in memory of the hardware processing device that will implement the programming, or otherwise. Although the description of computer-readable media contained herein typically refers to the memory of the hardware processing device, or a mass storage device, such as a hard disk or CD-ROM drive, it should be appreciated by those skilled in the art that computer-readable media can be any available media that can be accessed by a personal computer or other processing system. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. Computer storage media include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 5:
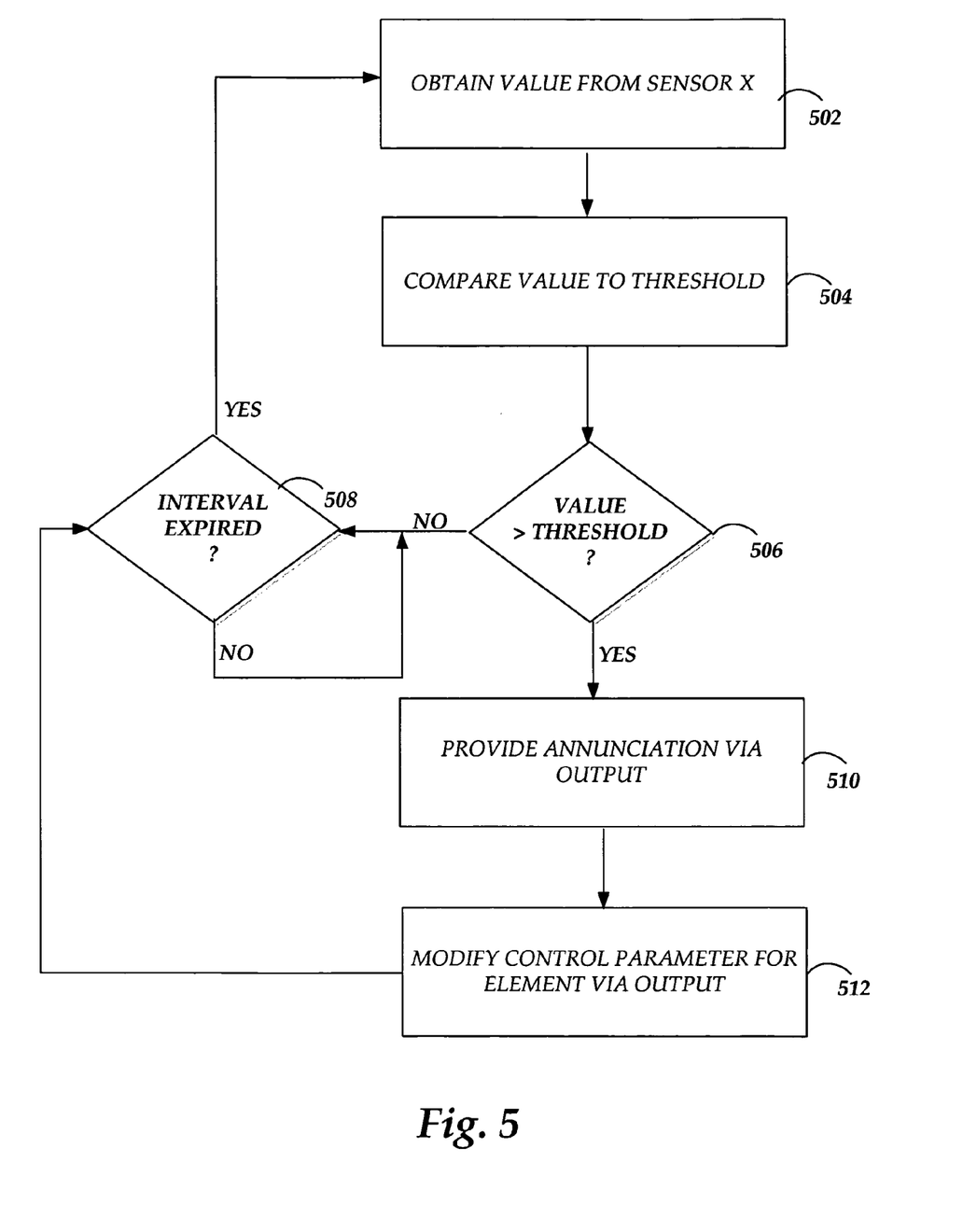
FIG. 5 is an operational flow of one example of an application program for monitoring a sensor that may be executed by the softprocessor.

FIG. 5 shows the logical operations of one example of a portion of an application program for monitoring a sensor and providing related logic and control. The logical operations begin at value operation 502 where the application directs the softprocessor to obtain a value from a particular sensor which has an address on the bus. The softprocessor executes this instruction to thereby direct the hardware processing device to perform a read from a particular bus address. For example, the application program may direct that the temperature of a disk drive be read.

Upon receiving this value, the application program directs the softprocessor to compare the value to a threshold value stored at a memory location of the softprocessor at compare operation 504. For example, the temperature value that has been read may be compared to a threshold temperature stored in memory that represents the maximum temperature that may be allowed prior to initiating additional cooling. If the value is below the threshold, as detected at query operation 504, then query operation 508 detects whether the polling interval for that sensor value has expired. If not, then there is a delay until the polling interval does expire, and then the value is again obtained from the sensor.

Where it is detected that the value does exceed the threshold, then the application program may direct that various actions occur. For example, the application program may direct that the softprocessor provide an annunciation, such as by causing an output of the hardware processing device to turn on a warning light at annunciation operation 510. As another example, the application program may direct that the softprocessor modify a control parameter for an element via an output at control operation 512. For instance, the application program may direct the softprocessor to communicating with a control circuit for a fan over the data bus of the hardware processing device to increase the duty cycle of power to the fan and thereby increase the cooling provided by the fan to address the overheating situation that has been detected.

The application program may define many of these monitoring loops for the suite of sensors of a monitoring system. Accordingly, the hardware processing device may be controlled by the softprocessor to maintain communication with the 200-300 sensors of a system while also interacting with control circuits for the various components being monitored.

Figure 6:
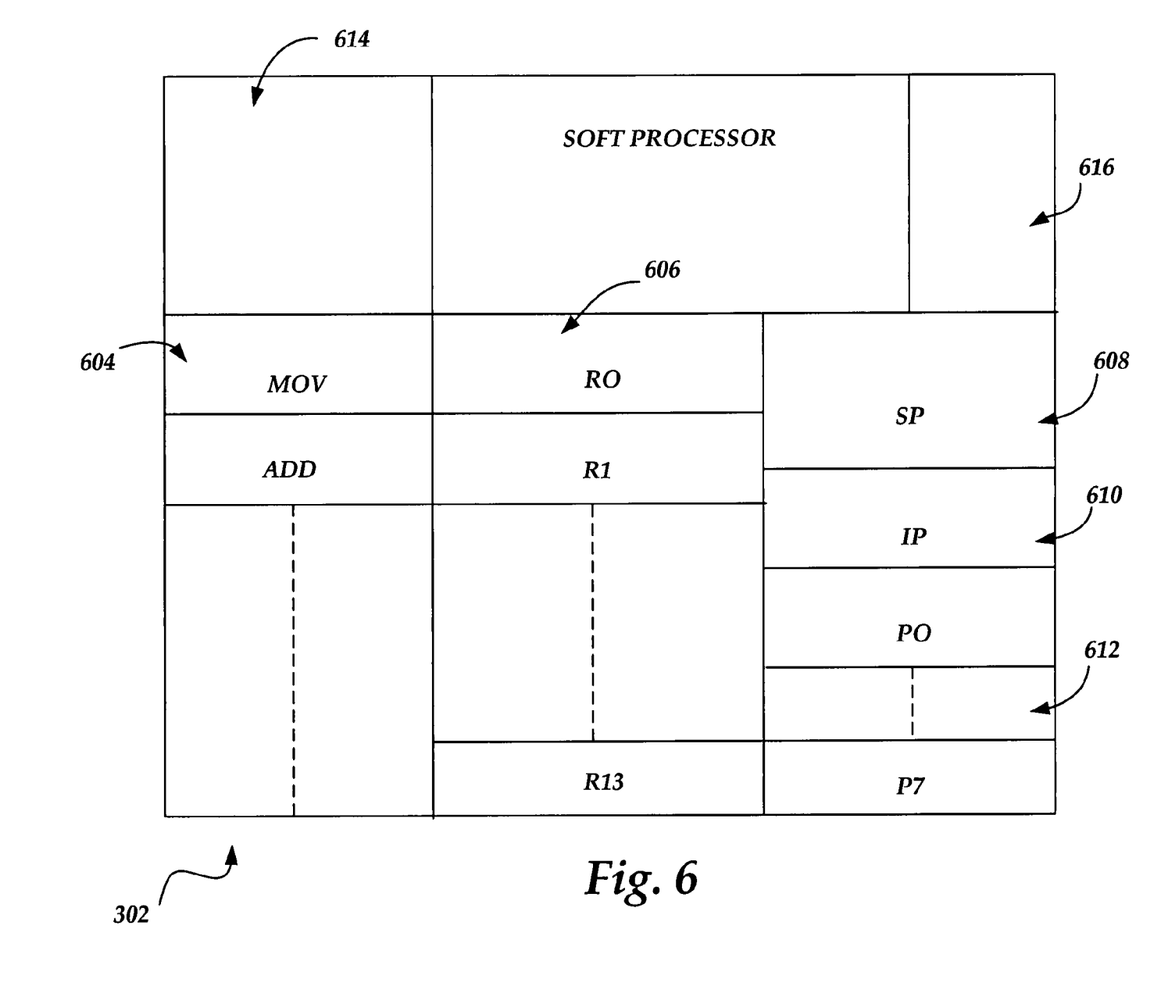
FIG. 6 is a diagram illustrating the elements of the softprocessor.

FIG. 6 shows the elements of one example of the softprocessor 302. The softprocessor 302 includes a defined set of instructions 604, such as those set forth in Appendix D, that can be called upon by the application program. The softprocessor 302 also includes a set of 14 general-purpose registers 306, which are labeled R0-R13 in Appendix D. These registers may be defined as 16 bit registers or as 32 bit registers.

Pointer registers are also included. The softprocessor 302 also includes a stack pointer register 608 that holds a value pointing to a current location within a stack 616 defined in available memory of the hardware processing device. The stack pointer register 616 is 16 bits in size. An instruction pointer register 610 is included to hold a value pointing to the location of a current instruction that is being called upon by the application program from the set 604 of instructions. The instruction pointer register 610 is 16 bits in size.

The softprocessor 302 includes additional features as well. For example, the softprocessor 302 also includes a set 612 of eight predicate registers, which are labeled P0-P7 in Appendix D, that are one bit in size. Also, memory space 614 is defined for the softprocessor 302 within the available memory space of the hardware processing device.

As discussed above, the application of these elements of the softprocessor in decoding instructions of the application program are discussed in the document of Appendix D, while source code to instantiate the softprocessor is provided in Appendix A. It will be appreciated that the details provided in Appendices A-D are for a specific implementation and are provided for purposes of illustration. These details are not intended to limit the scope of the invention.

Furthermore, the various embodiments described above are provided by way of illustration only and should not be construed to limit the invention. Those skilled in the art will readily recognize various modifications and changes that may be made to the present invention without following the illustrative embodiments and applications illustrated and described herein, and without departing from the true spirit and scope of the present invention, which is set forth in the following claims.

What is claimed is:

1. A system for providing programming for a hardware processing device of a monitoring system including a plurality of sensors, comprising:

a softprocessor binary compiled for and being executed by the hardware processing device to create a softprocessor configured to execute an application program binary and to establish processor characteristics that obscure the hardware processing device from the application program binary when executed on the softprocessor; and an application program binary setting forth instructions defining the plurality of sensors that the hardware processing device should communicate with, a bus address for each of the defined sensors, and logic for monitoring the defined sensors, the application program binary being compiled for and executable by the softprocessor, wherein execution of the application program binary by the softprocessor results in the hardware processing device communicating with the defined sensors at the specified bus addresses and utilizing the logic to monitor the defined sensors.

2. The system of claim 1, wherein the softprocessor binary is created from a first source code that defines virtual instructions, registers, and memory for use by the application program binary.

3. The system of claim 1, wherein the application program binary is created from a second source code that calls upon the virtual instructions, registers, and memory of the softprocessor.

4. The system of claim 1, wherein the plurality of sensors comprise a fan speed sensor.

5. The system of claim 2, wherein the first source code is written in C language code and wherein the first code is compiled with a C language compiler for the hardware processing device.

6. The system of claim 3, wherein the second source code is written in assembly language code that references the virtual instructions, registers, and memory and wherein the second source code compiled with an assembly language compiler for the softprocessor.

7. The system of claim 3, wherein the hardware processing device communicates over a bus with the plurality of sensors.

8. A computer storage medium including instructions that when executed by a hardware processing device of a monitoring system having a plurality of sensors performs operations for:
- establishing a softprocessor by executing a softprocessor binary on the hardware processing device, the softprocessor configured to execute an application program and to establish processor characteristics that obscure the hardware processing device from the application program when executed on the softprocessor; and
- executing an application program upon the softprocessor to direct the hardware processing device to monitor the plurality of sensors, the application program defining the sensors that the hardware processing device should monitor, a bus address for the defined sensors, and logic for use by the softprocessor in monitoring the defined sensors.

9. The computer storage medium of claim 8, wherein the instructions result from compiling a first source code for the hardware processing device to create a softprocessor program binary operable upon the hardware processing device to establish the softprocessor and compiling a second source code for the softprocessor to create an application program binary operable by the softprocessor to implement the application program.

10. The computer storage medium of claim 9, wherein the first source code defines virtual instructions, registers, and memory for use by the application program binary.

11. The computer storage medium of claim 10, wherein the first source code is written in C language code and wherein compiling the first source code comprises compiling the C language code with a C language compiler for the hardware processing device.

12. The computer storage medium of claim 10, wherein the second source code calls upon the virtual instructions, registers, and memory of the softprocessor.

13. The computer storage medium of claim 12, wherein the second source code is written in assembly language code that references the virtual instructions, registers, and memory and wherein compiling the second source code comprises compiling the assembly language code with an assembly language compiler for the softprocessor.

14. The computer storage medium of claim 13, wherein the hardware processing device communicates over a bus with the plurality of sensors according to the application program implemented by the softprocessor.

15. An apparatus, comprising:
- a hardware processing device;
- a plurality of sensors communicatively coupled to the hardware processing device via a bus, each of the sensors having a bus address;
- a memory storing a softprocessor binary compiled for and being executed by the hardware processing device to create a softprocessor configured to execute an application program binary and to establish processor characteristics that obscure the hardware processing device from the application program binary when executed on the softprocessor; and
- a memory storing an application program binary setting forth instructions defining the plurality of sensors, the bus address for each of the plurality of sensors, and logic for monitoring the plurality of sensors, the application program binary being compiled for and executable by the softprocessor, and wherein execution of the application program binary by the softprocessor results in the hardware processing device communicating with the defined sensors at the specified bus addresses and using the logic to monitor the plurality of sensors.

16. The apparatus of claim 15, wherein the processor characteristics comprise virtual instructions, registers, and memory for use by the application program binary and wherein the application program binary calls upon the virtual instructions, registers, and memory of the softprocessor to cause the hardware processing device to monitor the plurality of sensors.

* * * * *